United States Patent [19]

Tellini

[11] Patent Number: 4,480,769
[45] Date of Patent: Nov. 6, 1984

[54] RE-USABLE CONTROLLED OUTFLOW AND LIQUID-TIGHT PLUG FOR BOTTLES AND THE LIKE

[76] Inventor: Antonio Tellini, Via Salvotti 22, Villanova di Guidonia, Rome, Italy

[21] Appl. No.: 388,410

[22] Filed: Jun. 14, 1982

[51] Int. Cl.$^3$ .............................................. B65D 47/00
[52] U.S. Cl. ..................................... 222/519; 222/554
[58] Field of Search ............... 222/519, 522, 546, 553, 222/551, 549, 554, 563

[56] References Cited

U.S. PATENT DOCUMENTS

| | | | |
|---|---|---|---|
| 2,165,825 | 7/1939 | Bultzingslowen | 222/519 |
| 2,513,489 | 7/1950 | Jenkins | 222/549 |
| 2,618,800 | 11/1952 | Raab | 222/519 |
| 2,700,484 | 1/1955 | Rathsprecher | 222/519 |
| 2,877,918 | 3/1959 | Gardner | 222/522 |

FOREIGN PATENT DOCUMENTS

| | | | |
|---|---|---|---|
| 1209903 | 1/1966 | Fed. Rep. of Germany | 222/546 |
| 515688 | 2/1955 | Italy | 222/519 |

Primary Examiner—Joseph J. Rolla
Assistant Examiner—Kenneth Noland
Attorney, Agent, or Firm—Goodman & Teitelbaum

[57] ABSTRACT

A re-usable controlled outflow and liquid-tight plug for bottles and the like, the re-usable plug including a fixed element having an outflow opening therein, the fixed element being adapted to be secured on the neck portion of the bottle over the bottle mouth or opening. In one embodiment, the fixed element is snapped or force fitted onto the neck portion and in another embodiment, the fixed element is provided with internal threads so that it can be screwed on the neck portion of the bottle. A movable element is disposed over an upper portion of the fixed element, engaging members being provided therebetween to integrally join the movable element to the fixed element so that the movable element is slidable and partially rotatable thereon. The movable element is manually slidably moved from a first raised opened position uncovering the outflow opening of the fixed element, to a second lowered closed position closing the outflow opening, and then rotated to a third lowered locked position locking the movable element to the fixed element with the outflow opening being closed. The movable element is provided with a sealing member for sealing the opening of the bottle when the movable element is lowered in either the second closed or third locked position. The sealing member can have either a truncated conical head or a circular flat head for engagement with the opening in the bottle.

18 Claims, 7 Drawing Figures

RE-USABLE CONTROLLED OUTFLOW AND LIQUID-TIGHT PLUG FOR BOTTLES AND THE LIKE

BACKGROUND OF THE INVENTION

This invention relates to devices for closing bottle type containers and the like, and more particularly to a re-usable controlled outflow and liquid-tight plug.

Various devices are commonly used, and are known, for the closure of receptacles which have a neck portion, generally cylindrical. These devices span from the traditional cork plugs, which as the art has progressed, have been produced with different materials such as rubber, plastic, etc., whereby the shape thereof substantially has remained unchanged, up to the more modern crown type metal plugs mechanically applied on the mouth of the receptacles in discussion after the bottles have been filled.

Such devices further display various inconveniences, especially in a practical sense. Since, besides the fact that some of the devices do not have re-usability and sealing characteristics, all the devices have in common a main defect deriving from the necessity of having to remove them fro the receptacle every time it is desired to pour a liquid, and then having to apply them again for the closure of the receptacle itself. These operations, and especially the first one, generally involve the use of appropriate tools.

SUMMARY OF THE INVENTION

Accordingly, it is an object of the present invention to provide a plug for bottles and the like so constructed that, once it has been mounted on the outflow opening of a receptacle, it does not involve the necessity of having to remove or re-apply it in order to open or respectively close the outflow opening.

It is a further object of the present invention to provide a plug of the type mentioned above which has means for providing a liquid-tight closure of the outflow opening of the receptacle on which it is applied.

Another object of the present invention is to provide a plug of the type mentioned which can be re-used indefinitely.

It is still another object of the present invention to provide a plug of the type mentioned above which displays peculiar aspects of structural simplicity and operation.

It is a further object of the present invention to provide a plug as mentioned above which is capable of being produced on an industrial basis and at particularly low costs.

These objects are achieved in accordance with the preferred embodiments of the present invention, wherein the re-usable plug includes a fixed element having an outflow opening therein, the fixed element being adapted to be secured on the neck portion of a bottle and the like, over the bottle mouth or opening. In one embodiment, the fixed element is snapped or force fitted onto the neck portion, and in another embodiment, the fixed element is provided with internal threads so that it can be screwed on the neck portion of the bottle. A movable element is disposed over an upper portion of the fixed element, engaging members being provided therebetween to integrally join the movable element to the fixed element so that the movable element is slidable and partially rotatable thereon. The movable element is manually slidably moved from a first raised opened position uncovering the outflow opening of the fixed element, to a second lowered closed position closing the outflow opening, and then rotated to a third lowered locked position locking the movable element to the fixed element with the outflow opening being closed. The movable element is provided with a sealing member for sealing the opening of the bottle when the movable element is lowered in either the second closed or third locked position. The sealing member can have either a truncated conical head or a circular flat head for engagement with the opening in the bottle.

BRIEF DESCRIPTION OF THE DRAWINGS

With the above and additional objects and advantages in view, as will hereinafter appear, this invention comprises the devices, combinations and arrangements of parts hereinafter described by way of example, and illustrated in the accompanying drawings, of a preferred embodiment in which.

In various figures of the drawings, like reference characters designate like parts.

DETAILED DESCRIPTION OF THE PREFERRED EMBODIMENTS

Figure 1:
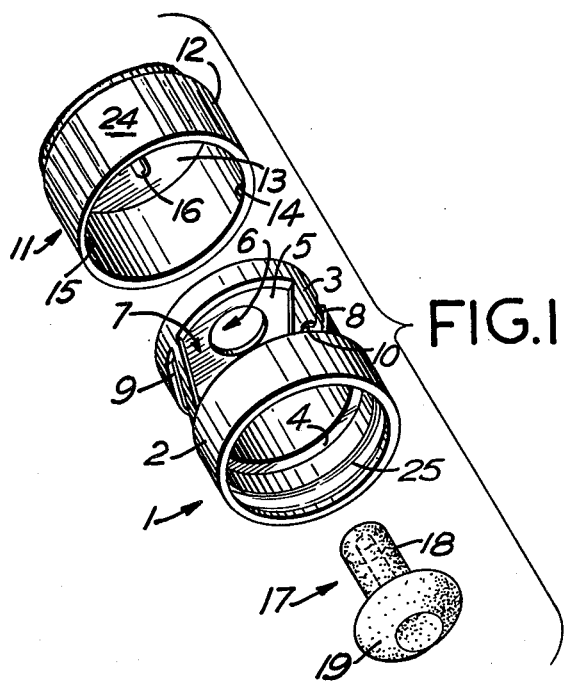
FIG. 1 is an exploded perspective view illustrating a re-usable plug in accordance with the present invention.

Referring now to the drawings, FIG. 1 shows a fixed element 1 of the re-usable plug according to the present invention. The fixed element 1 has a cylindrical hollow body including a first portion 2 which is to be pressure mounted externally on the free end of the neck portion of the bottle and the like. The first portion 2 is integral with a second portion 3, the diameter of the second portion 3 being reduced with respect to that of the first portion 2, in order to provide therebetween a flat, annular connection step 4.

The second portion 3 is closed at the upper end thereof by a flat surface 5. A circular hole 6, centrally positioned, extends through the flat surface 5. An opening 7 extends through a section of the perimetrical wall of the second portion 3. The side edges of the opening 7 are slanted in opposite directions from top to bottom, with one side edge slanting rearwardly from the top to the bottom and the other side edge slanting forwardly from the top to the bottom, so the opening 7 has the same arcuate dimensions at the top and bottom thereof.

Grooves 8 and 9 are formed parallelly and adjacent to the respective slanted side edges of the opening 7 in the second portion 3 of the fixed element 1. The grooves end in coincidence with the step 4 with respective groove end portions 10 being directed circumferentially in the same direction, only one of the groove end portions 10 being shown in FIG. 1.

The reference number 11 indicates a movable element of the plug of the present invention. The movable element 11 includes a cylindrical cap or hood, the inside diameter of which is about the same, except for a small clearance, as the outside diameter of the second portion 3 of the fixed element 1. The outside diameter of the cap is the same as the outside diameter of the first portion 2 of the fixed element 1. Thus, the movable element 11 defines a perimetrical cover 12. The upper end of the cover 12 is closed by a flat surface member 13.

On the inner surface of cover 12, in vicinity of the base edge thereof, two small pins 14 and 15 are provided integral with the base, the pins 14 and 15 being opposed diametrically as shown in FIG. 1. A third pin 16, of larger dimension than the pins 14 and 15, is integral with an inside surface of the upper surface member 13, the pin 16 extending perpendicularly from a central position of the surface member 13.

Figure 2:
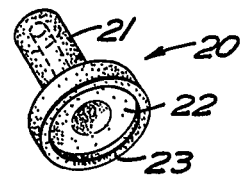
FIG. 2 is a perspective view illustrating a modified sealing member of the present invention.

A sealing member completes the plug according to the present invention, the sealing member being shown according to two variations in FIGS. 1 and 2.

In a first form of embodiment the sealing member, generally indicated at 17 in FIG. 1, the sealing member 17 includes a cylindrical stem 18 provided with a hole axially therein. One end of the stem 18 is integral with an enlarged truncated conical head 19. In the second form of embodiment the sealing member, generally indicated at 20 in FIG. 2, the sealing member 20 is provided with a cylindrical stem 21 also having a hole axially therein. One end of the stem 21 is integral with a flat enlarged head 22 of circular shape, the head 22 being provided perimetrically with a protruding edge 23. The stems 18 and 21 of the sealing members 17 and 20, respectively, have a diameter which is smaller than that of the circular through hole 6 in the flat closure surface 5 of the second portion 3 of the fixed element 1.

Figure 6:
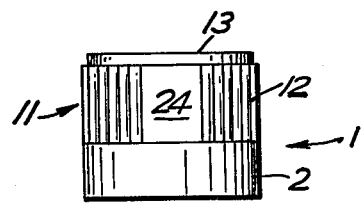
FIG. 6 is an elevational view, showing the re-usable plug in a closed position.
Figure 7:
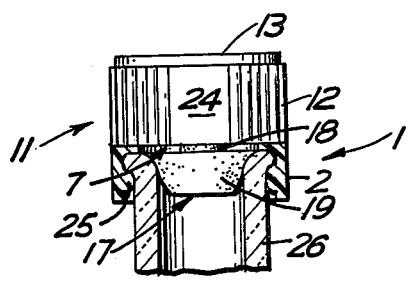
FIG. 7 is an elevational view, partly in cross-section, showing the re-usable plug of the FIG. 6 secured on the neck portion of the bottle.

It is noted, that the cover 12 of the movable element 11 is provided with a knurling on the perimetrical outside surface for improving the gripping thereof, the knurling being omitted however on a smooth section 24 in order to indicate the position of the opening 7 in fixed element 1 when the plug is in a closed position, as shown in FIGS. 6 and 7.

Figure 3:
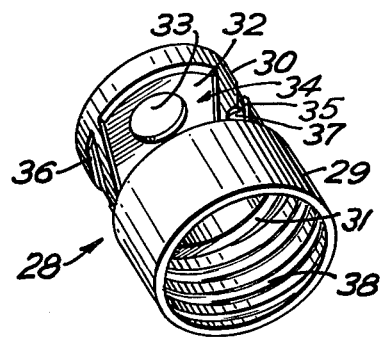
FIG. 3 is a perspective view illustrating a modified fixed element of the present invention.
Figure 5:
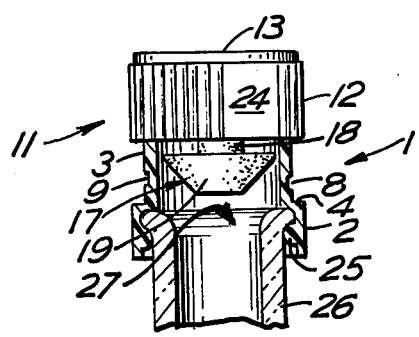
FIG. 5 is an elevational view, partly in cross-section, showing the re-usable plug of FIG. 4 secured on the neck portion of a bottle.

It should also be noted, that the first portion 2 of the fixed element 1 is provided with a protuberance or rib 25 disposed therein around the inner circumference thereof, as shown in FIG. 1, in order for the first portion 2 to be snapped or force fitted onto the neck portion 26 of a bottle and the like, as shown in FIGS. 5 and 7, so that the plug of the present invention is secured over the mouth or opening 27 of the bottle. However, in some cases, the neck portion of the bottle is provided with external threads thereon. Accordingly, FIG. 3 shows a modified fixed element 28 having a first portion 29 and a second portion 30 connected together by a flat annular step 31.

It is noted, that the second portion 30 is the same as the above-mentioned second portion 3, and includes a flat closing surface 32 provided with a circular hole 33 therein at the upper end of the second portion 30. Here again, an opening 34 extends through a section of the perimetrical wall of the second portion 30, wherein the side edges of the opening 34 are slanted from top to bottom in the same manner mentioned above with respect to opening 7. Grooves 35, 36 are again formed parallelly and adjacent to the respective slanted side edges of the opening 34, with the grooves ending in coincidence with the step 31, the groove end portions 37 being directed circumferentially in the same direction, whereby only one of the groove end portions 37 is shown in FIG. 3.

Up to this point, the fixed element 28 is identical with the fixed element 1, so that the fixed element 28 can be assembled with the above-mentioned movable element 11, and either of the sealing members 17 or 20. Accordingly, the first portion 29 of the fixed element 28 is longitudinally extended to a longer length than the above-mentioned first portion 2 of the fixed element 1. The elongated first portion 29 is provided with internal threads 38, so that the fixed element 28 can be screwed onto an externally threaded neck portion of a bottle and the like.

Figure 4:
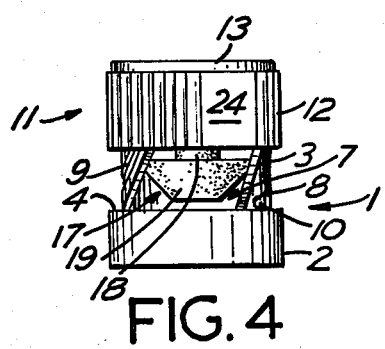
FIG. 4 is an elevational view showing the re-usable plug in an opened position.

In order to assemble the above-mentioned elements, first, one of the two small pins 14, 15 of the movable element 11 is brought into engagement with one of the grooves 8 and 9 in the fixed element 1 or one of the grooves 35, 36 in the fixed element 28. Then, the other one of the small pins 14, 15 is snapped into the other one of the grooves 8, 9 or 35, 36 so that the movable element 11 is integrally secured on either the fixed element 1 or the fixed element 28. A selected one of the sealing members 17, 20 is then mounted on the assembled fixed and movable elements by inserting the respective stem 18 or 21 thereof through the hole 6 or 33 from the bottom of the flat surface 5 or 32, respectively. During this insertion, the pin 16 of the movable element 11 is forced into the axial hole of the respective stem 18 or 21 for securement thereto. It is noted, that the head 19 or 22 of the sealing members 17 or 20 is positioned below the bottom face of the flat surface 5 or 32 of the fixed element, as indicated in FIG. 4.

In the operation of the plug, with the elements assembled as mentioned above, the movable element 11 can be moved manually while still being integrally connected to the fixed element 1 or 28. The small pins 14, 15 of the movable element 11 engagingly slide in their respective grooves 8, 9 or 35, 36 so that the movable element 11 can be elevated to a first raised position, as shown in FIG. 4, with the sealing member 17 or 20 also being in a raised position, wherein the opening 7 or 34 of the fixed element 1 or 28 is completely exposed. By sliding the pins 14 and 15 downwardly to a second lowered position, as indicated in FIG. 6, the lower edge of the cover 12 rests on the step 4 of the fixed member 1 or on the step 31 of the fixed element 28, so that the opening 7 or 34 is closed and the sealing member 17 or 20 is also lowered to a sealing position. With the movable element 11 in this lowered position, the small pins 14, 15 can be rotated into engagement in the respective circumferential groove end portions 10 or 37 of the grooves 8, 9 or 35, 36 to provide a third locking position of the movable element 11 on the fixed element 1 or 28, as shown in FIG. 6.

In use, the fixed element 1 or 28 is secured on the neck portion of the bottle and the like over the bottle mouth or opening, where only the fixed element 1 will be described below, for example only, the application of the fixed element 28 being similar thereto except that fixed element 28 is screwed onto the externally threaded neck portion of the bottle. Accordingly, the first portion 2 of the fixed element, 1 is snapped or force-fitted onto the neck portion 26 of the bottle so that the internal protrusion 25 thereof is in engagement on the bottle, as shown in FIG. 5. With the movable element 11 in the first raised position, as shown in FIG. 5, the outflow of liquid contained in the bottle and the like will be allowed through the opening 7 in the fixed element 1, which is in fluid communication with the opening 27 of the receptacle in use.

After the movable element 11 is moved to the second or lowered position, the outflow from the bottle will be interrupted or stopped wherein the sealing member 17, as shown in FIG. 7, or the sealing member 20 will seal the opening 27 of the bottle. The truncated conical enlarged head 19 of the sealing member 17 is inserted, by downward pressure of the movable element 11 into the opening 27 of the bottle. Likewise, the flat enlarged head 22 of the sealing member 20 is overlappingly engaged against the opening of the bottle with the protruding edge 23 of the sealing member 20 engaging the peripheral outer edges of the bottle mouth. In this lowered position, by rotating the movable element 11 on the fixed element 1 as previously described, the movable element 11 is locked on the fixed element 1 in the closed position, as shown in FIG. 7.

It is noted, that the flow of the liquid from the bottle can be controlled by selectively positioning the movable element 11 vertically along the second portion 3 or 30 of the fixed element 1 or 28, between the completely first raised position as shown in FIG. 5, and the completely lowered closed position as shown in FIG. 7, in order to regulate the outflow size of the opening 7 or 34 of the fixed element 1 or 28, whereby the movable element functions as a shutter.

The plug according to the present invention may be advantageously fabricated from a plastic material having the appropriate rigid and elastic characteristics for the various elements thereof. The components of the plug can be produced by a simple molding operation, wherein the edges of the opening 7 or 34 in the fixed element 1 or 28 are slanted to simplify the production thereof. Thus, the plug of the present invention ensures a long period of use, along with an extremely reduced production cost thereof.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A re-usable controlled outflow and liquid-tight plug for bottles and the like, said plug comprising:
  a fixed element having a hollow cylindrical body adapted to be secured on a neck portion of the bottle over the mouth of the bottle, an outflow opening provided in the perimetrical wall of said cylindrical body for flow communication with both the hollow interior thereof and the bottle mouth;
  a movable element having a hollow cylindrical body to receive an upper portion of said fixed element concentrically therein in a telescopic relationship, said movable element including a top wall for closing its upper end;
  engaging means for integrally joining said movable element to said fixed element and for permitting said movable element to vertically slide on said fixed element when said movable element is disposed over said fixed element, said movable element being manually slidably moved between a first raised position uncovering said outflow opening of said fixed element to define an opened condition, and a second lowered position covering said outflow opening of said fixed element to define a closed condition;
  said engaging means including a vertical groove disposed on each vertical side of said outflow opening of said fixed element, and a pair of diametrically opposed pins being provided within a lower portion of said movable element, each of said pins being engaged in an associated one of the grooves for sliding movement therein; and
  a sealing member secured to an interior surface of said top wall of said movable element for movement therewith to seal the bottle mouth when said movable element is in said second lowered position;
  whereby the flow of liquid from the bottle is controlled by selectively positioning said movable element vertically along said fixed element between said first raised position and said second lowered position to regulate outflow size of said outflow opening of said fixed element.

2. A plug as in claim 1, wherein said grooves are slanted downwardly from top to bottom, one groove being slanted downwardly from the top towards a front portion of said fixed element, and the other groove being slanted in an opposite direction downwardly from the top towards a rear portion of said fixed element.

3. A plug as in claim 2, wherein each vertical side of said outflow opening of said fixed element is downwardly slanted from top to bottom in opposite directions corresponding to each of said grooves adjacent thereto.

4. A plug as in claim 1, wherein a lower end of each of said grooves includes a circumferentially directed leg portion, said groove leg portions extending in the same direction to engage said pins therein to provide a third lowered position for locking said movable element to said fixed element when said movable element is rotated relative to said fixed element.

5. A plug as in claim 4, wherein said fixed element includes a lower portion having a large diameter and said upper portion having a smaller diameter, and a flat annular step integrally connecting said upper and lower portions together, a lower edge of said movable element engaging said flat annular step in said second lowered position of said movable element, said grooves being disposed in said upper portion with said groove leg portions being in coincidence with said flat annular step.

6. A plug as in claim 1, wherein said fixed element includes a lower portion having a large diameter and said upper portion having a small diameter, and a flat annular step integrally connecting said upper and lower portions together, a lower edge of said movable element engaging said flat annular step in said second lowered position of said movable element.

7. A plug as in claim 6, wherein said hollow cylindrical body of said movable element has an internal diameter which is slightly less than the outside diameter of said lower portion of said fixed element, and has an outside diameter which is substantially the same as the outside diameter of said lower portion of said fixed element.

8. A plug as in claim 6, wherein said lower portion of said fixed element is provided with an internal rib therein.

9. A plug as in claim 6, where said lower portion of said fixed element is provided with internal threads therein.

10. A plug as in claim 1, wherein said movable element is perimetrically provided with a knurled outside surface interrupted by a smooth outside section, said smooth outside section being in coincidence with said outflow opening of said fixed element when said movable element is in the lowered position to indicate the position of said outflow opening when covered by said movable element.

11. A re-usable controlled outflow and liquid-tight plug for bottles and the like, said plug comprising:
a fixed element having a hollow cylindrical body adapted to be secured on a neck portion of the bottle over the mouth of the bottle, an outflow opening provided in the perimetrical wall of said cylindrical body for flow communication with both the hollow interior thereof and the bottle mouth;
a movable element having a hollow cylindrical body to receive an upper portion of said fixed element concentrically therein in a telescopic relationship, said movable element including a top wall for closing its upper end;
engaging means for integrally joining said movable element to said fixed element and for permitting said movable element to vertically slide on said fixed element when said movable element is disposed over said fixed element, said movable element being manually slidably moved between a first raised position uncovering said outflow opening of said fixed element to define an opened condition, and a second lowered position covering said outflow opening of said fixed element to define a closed condition; and
a sealing member secured to an interior surface of said top wall of said movable element for movement therewith to seal the bottle mouth when said movable element is in said second lowered position;
said sealing member including an enlarged head portion and an integral stem portion extending from a central position on said head portion, said head portion being fabricated from a relatively elastic material, said stem portion having an axial hole therein, said top wall of said movable element being provided with a pin protruding from a central position on said interior surface of said top wall, said pin being engaged in said axial hole of said stem portion for securement therebetween;
said upper portion of said fixed element having an upper end wall, said upper end wall having a central hole therein to receive said stem portion movably therethrough;
whereby the flow of liquid from the bottle is controlled by selectively positioning said movable element vertically along said fixed element between said first raised position and said second lowered position to regulate outflow size of said outflow opening of said fixed element.

12. A plug as in claim 11, wherein said head portion of said sealing member includes a truncated conical head.

13. A plug as in claim 11, wherein said head portion of said sealing member includes a flat circular head provided with a protruding perimetrical edge.

14. A plug as in claim 11, wherein said fixed element includes a lower portion having a large diameter and said upper portion having a small diameter, and a flat annular step integrally connecting said upper and lower portions together, a lower edge of said movable element engaging said flat annular step in said second lowered position of said movable element.

15. A plug as in claim 14, wherein said hollow cylindrical body of said movable element has an internal diameter which is slightly less than the outside diameter of said lower portion of said fixed element, and has an outside diameter which is substantially the same as the outside diameter of said lower portion of said fixed element.

16. A plug as in claim 14, wherein said lower portion of said fixed element is provided with an internal rib therein.

17. A plug as in claim 14, wherein said lower portion of said fixed element is provided with internal threads therein.

18. A plug as in claim 11, wherein said movable element is perimetrically provided with a knurled outside surface interrupted by a smooth outside section, said smooth outside section being in coincidence with said outflow opening of said fixed element when said movable element is in the lowered position to indicate the position of said outflow opening when covered by said movable element.

* * * * *